June 6, 1950 — T. C. SHARP — 2,510,607
FILM SOUND RECORD EDITING AND INSPECTION SYSTEM
Filed Jan. 30, 1947
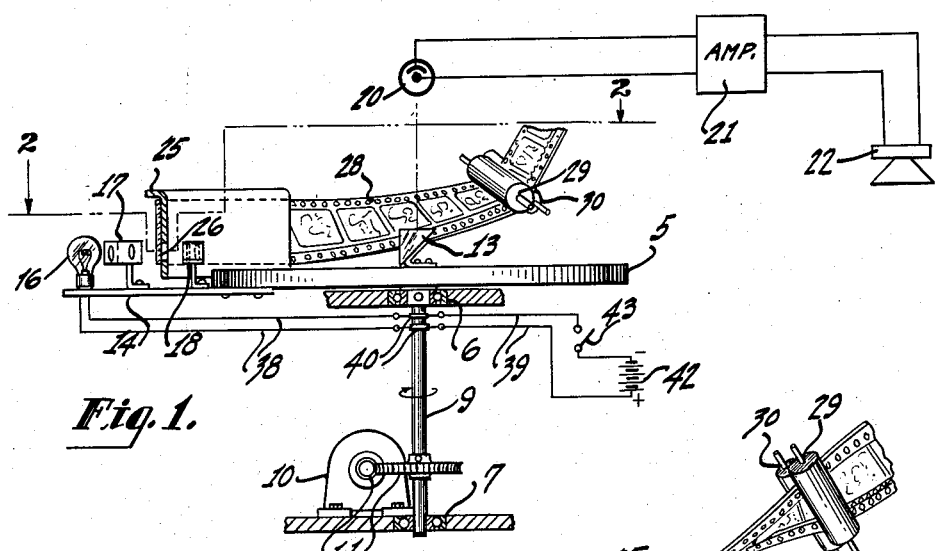
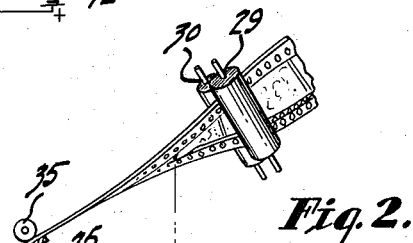
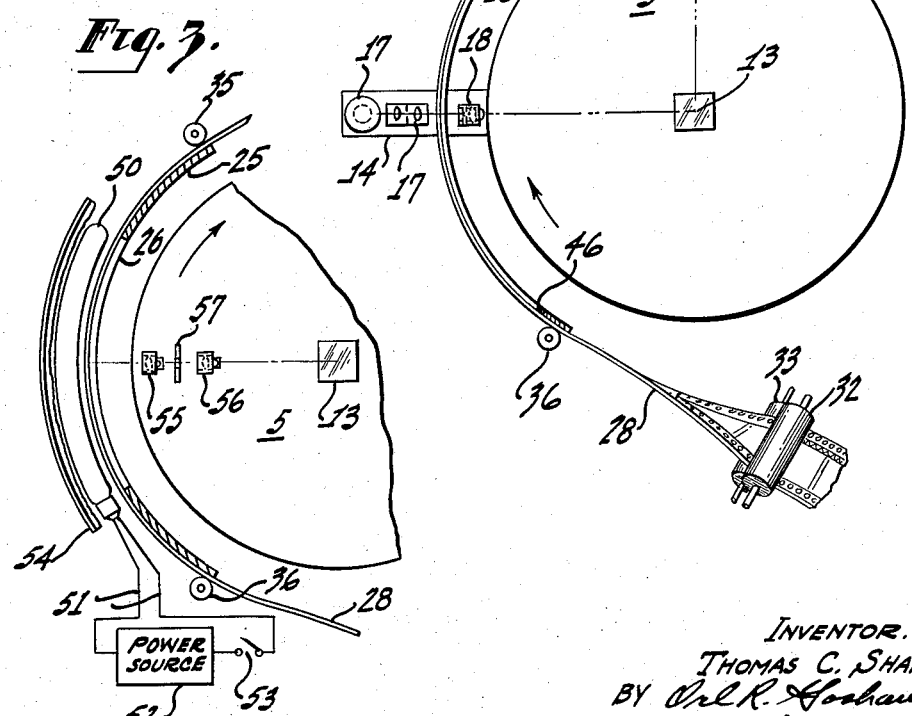
INVENTOR.
THOMAS C. SHARP
BY *Orl R. Hoshaw*
ATTORNEY.

Patented June 6, 1950

2,510,607

UNITED STATES PATENT OFFICE 2,510,607

FILM SOUND RECORD EDITING AND INSPECTION SYSTEM

Thomas C. Sharp, North Hollywood, Calif., assignor to Radio Corporation of America, a corporation of Delaware Application January 30, 1947, Serial No. 725,341

3 Claims. (Cl. 179—100.3)

This invention relates to sound reproducing apparatus and particularly to editing and inspection devices for sound film. In the production of sound motion pictures, editing devices are used to view the pictures and listen to the sound track for the purpose of detecting and locating certain points in the track which are imperfect in some manner or other. These imperfections may be scratches on the film, a spot or extraneous matter adhering to the film or poor modulations caused by defects in the recording or printing operations.

Most editing devices employ the standard sound reproducing elements such as a film driving mechanism, light source and optical units. These devices, however, are not convenient for sound track inspection where it is necessary to reproduce the same short section of film several times to accurately locate a certain point on the sound track. To accomplish this with the present type of editing and inspection devices, the film must be rewound or reversed and then run forward again. This requires considerable time and it is difficult to stop the film at the proper point.

An editing device of the general nature of this invention is disclosed and claimed in U. S. Patent No. 2,235,029 of March 18, 1941. This patented device is capable of reproducing short sections of film more rapidly than the usual type of editing apparatus but it still requires the reversing or rewinding of the film for each reproduction even though the film to be inspected is loosely placed in baskets. Thus prior systems have film driving mechanisms and stationary optical and reproducing elements. The present invention reverses this procedure by maintaining the film stationary and repeatedly moving the reproducing elements over short sections of the film. In this manner, any section of the film may be quickly positioned manually and the section may be rapidly reproduced any number of times until the exact point is quickly located.

The invention in brief, therefore, includes an element for maintaining a short section of film in a fixed or stationary scanning position, and a rotatable light source and scanning optical unit, or a stationary elongated light source with a rotating optical unit and slit for scanning a certain predetermined portion of the sound tract. Various sections of the sound record may be quickly positioned and will be repeatedly reproduced by the rotating elements.

The principal object of the invention, therefore, is to facilitate the locating of points of imperfections or points at which certain words or syllables of words appear on a sound track.

Another object of the invention is to provide an improved system for reproducing short sections of a sound record.

A further object of the invention is to provide an improved system for repeatedly and rapidly reproducing sections of a sound record.

A still further object of the invention is to provide a sound reproducing system wherein the sound record is stationary and the sound scanning elements are movable.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a diagrammatic elevational view of a sound record inspection system embodying the invention.

Fig. 2 is a plan view of the invention taken along the line 2—2 of Fig. 1, and

Fig. 3 is a plan view showing a modification of the invention shown in Figs. 1 and 2.

Referring to the drawings in which the same numerals identify like elements, a turntable 5 is mounted on a vertically disposed shaft 9 rotatable on bearings 6 and 7, the shaft 9 being driven by a motor 10 through gears 11. Mounted at the center of turntable 5, and in alignment with the axis of shaft 9, is a reflector prism 13, while on a bracket 14 extending from the rim of the table there is mounted certain film scanning elements which include a light source 16, a slit lens assembly unit 17 and a projecting lens unit 18. These scanning elements and the prism 13 are rotated with the turntable 5 so that light from the lamp 16, after passing through the sound track of the film, is reflected by the prism 13 to a stationary photoelectric cell 20. The output of cell 20 is amplified by an amplifier 21 and translated into sound waves by a loud speaker 22 in the usual amplifier and reproducing circuit.

Fixedly mounted in any suitable manner is a film holder, guide, or positioner 25, in the form of approximately a 120° section of a circle, the holder having an upper right angle flange to properly edge guide the film and position the sound track opposite a slot 26 in the holder. In the drawings, a film section 28 is shown positioned in the holder 25, the film at the ends of the holder being bent and twisted upwardly as it passes between rollers 29 and 30 and rollers 32 and 33. (See Fig. 2.) The film is raised at the ends of holder 25 to permit the lamp 16 and slit optical unit 17 to pass under the film at both ends of the holder so that the turntable 5 may continue to rotate with the film strip stationary. Rollers 35 and 36 are guide rollers at the ends of the holder 25. The lamp 16 is energized over conductors 38 and 39 through slip rings 40 on the shaft 9, the energy for the lamp being supplied from any suitable source, such as a battery 42, when a switch 43 is closed.

The operation of the device described above is such that the sound track portion of the film lying between the ends 45 and 46 of the slot 26 in the holder 25 is repeatedly reproduced as the scanning elements 16, 17 and 18 are rotated by the motor 10. That is, the speed of the scanning elements is that, or substantially that, of the speed of the film during the recording operation, that is 90 feet per minute for 35 mm. film. By manually shifting or sliding the film along the holder 25, various sections of the film may be quickly and repeatedly reproduced to determine the exact point being sought. The film may be quickly removed from the holder 25 by sliding the upper edge over the upper flange of the holder.

The film being inspected may be mounted on supply and take-up reels or permitted to fall loosely into baskets, the latter being common practice. There is, of course, no necessity to reverse the film and then drive it forward for reproduction as in the present type of film editing and inspection devices, the sound track being repeatedly scanned and reproduced as long as the motor 10 is energized. Thus the point of imperfect modulation or the point of any other type of defect in the sound track will be accurately located.

To avoid having any rotating element or elements beyond the holder 25, an elongated light source 50, as shown in Fig. 3, may be employed. The lamp 50 is energized over conductors 51 from any suitable power source 52, when a switch 53 is closed. A reflector 54 is positioned behind the lamp 50 to increase its efficiency while a lens may, if desired, be provided between the lamp and film holder 25. In this instance, the turntable 5 has mounted thereon the reflecting prism 13, as shown in Figs. 1 and 2, and also optical units 55 and 56 and a slit defining mask 57, these elements selecting a narrow portion of the sound track for projection on the photoelectric cell 20 as shown in the first described modification. Thus the device shown in Fig. 3 permits the film to pass directly to a take-up reel or to a basket without the necessity of raising it at the ends of the holder 25 to permit the passage of the rotating lamp source 16 and optical unit 17 of Figs. 1 and 2.

The above editing and inspection system, therefore, permits more rapid manipulation of the film and quicker inspections thereof, the repetitious reproductions avoiding all guess work in locating the point on the film which is being sought. Thus much time is save in the editing and inspection of motion picture sound tracks.

I claim:

1. A sound reproducing system comprising means for supporting a sound track film in a stationary position to form a segment of a circle, a fixed light source extending adjacent to and adapted to illuminate the sound track portion of said film located in said segment, a plurality of optical elements for scanning said sound track portion of said film, and means for rotating said scanning elements adjacent said sound track portion of said film to repeatedly reproduce said sound track portion.

2. A sound film inspection device comprising a turntable, means for rotating said turntable at a substantially constant speed, a reflector mounted at the center of said turntable and adapted to be rotated therewith, means for maintaining a section of the sound track of film in a stationary position adjacent the rim of said turntable, a stationary light source adjacent to and adapted to illuminate said section of said sound track, and means for translating light from said source after modulation by the sound track on the said film and reflection by said reflector into electrical currents.

3. A film inspection device comprising a turntable, means for rotating said turntable at a substantially constant speed, an arcuate film holder positioned around the periphery of said turntable and having a slot therein, said film holder maintaining a strip of film in a stationary position, a light source extending along a portion of said film holder and opposite said slot in said holder for illuminating the sound track on said film, means mounted on said turntable for selecting a narrow portion of the illuminated portion of said sound track of said film and for projecting the light therefrom, and means for receiving said light and translating variations therein into electrical currents.

THOMAS C. SHARP.

REFERENCES CITED

The following references are of record in the file of this patent:

UNITED STATES PATENTS

| Number | Name | Date |
|---|---|---|
| 2,195,701 | Kent | Apr. 2, 1940 |
| 2,348,050 | Barnstyn | May 2, 1944 |